(12) United States Patent
Lauka et al.

(10) Patent No.: US 10,467,668 B2
(45) Date of Patent: Nov. 5, 2019

(54) TECHNIQUES FOR PROVIDING ELECTRONIC ENDCAP ITEMS

(71) Applicant: Amazon Technologies, Inc., Seattle, WA (US)

(72) Inventors: Wesley Scott Lauka, Seattle, WA (US); Martin Cortez, Seattle, WA (US); Phuong-Thao Nguyen, Burien, WA (US); Andrew Olcott, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 359 days.

(21) Appl. No.: 15/384,220

(22) Filed: Dec. 19, 2016

(65) Prior Publication Data
US 2018/0174212 A1 Jun. 21, 2018

(51) Int. Cl.
*G06Q 30/00* (2012.01)
*G06Q 30/06* (2012.01)

(52) U.S. Cl.
CPC ..... *G06Q 30/0609* (2013.01); *G06Q 30/0601* (2013.01); *G06Q 30/0631* (2013.01); *G06Q 30/0633* (2013.01); *G06Q 30/0641* (2013.01); *G06Q 30/0643* (2013.01)

(58) Field of Classification Search
CPC ............................................... G06Q 30/06–08
USPC .............................................. 705/26.1–27.2
See application file for complete search history.

(56) References Cited

U.S. PATENT DOCUMENTS

2009/0234722 A1* 9/2009 Evevsky ................ G06Q 30/02
705/14.1

OTHER PUBLICATIONS

PCT/US2017/067057, "International Search Report and Written Opinion", dated Mar. 29, 2018, 11 pages.

* cited by examiner

*Primary Examiner* — Ethan D Civan
(74) *Attorney, Agent, or Firm* — Kilpatrick Townsend & Stockton LLP

(57) ABSTRACT

Systems and methods are provided herein for providing item information via a network page of an electronic marketplace. A set of items associated with a potential order of an electronic marketplace may be obtained. The set of items may be associated with a threshold condition that must be met prior to enabling completion of the potential order. Item information associated with the set of items, electronic representations of a portion of a plurality of related items, and a remainder value may be displayed on a network page provided by a mobile device. The remainder value may indicate a difference between a current state of the set of items and the threshold condition. A request to associate a related item of the plurality of related items with the potential order may be received. The set of items may be updated and the remainder value may be modified based on the update.

20 Claims, 12 Drawing Sheets

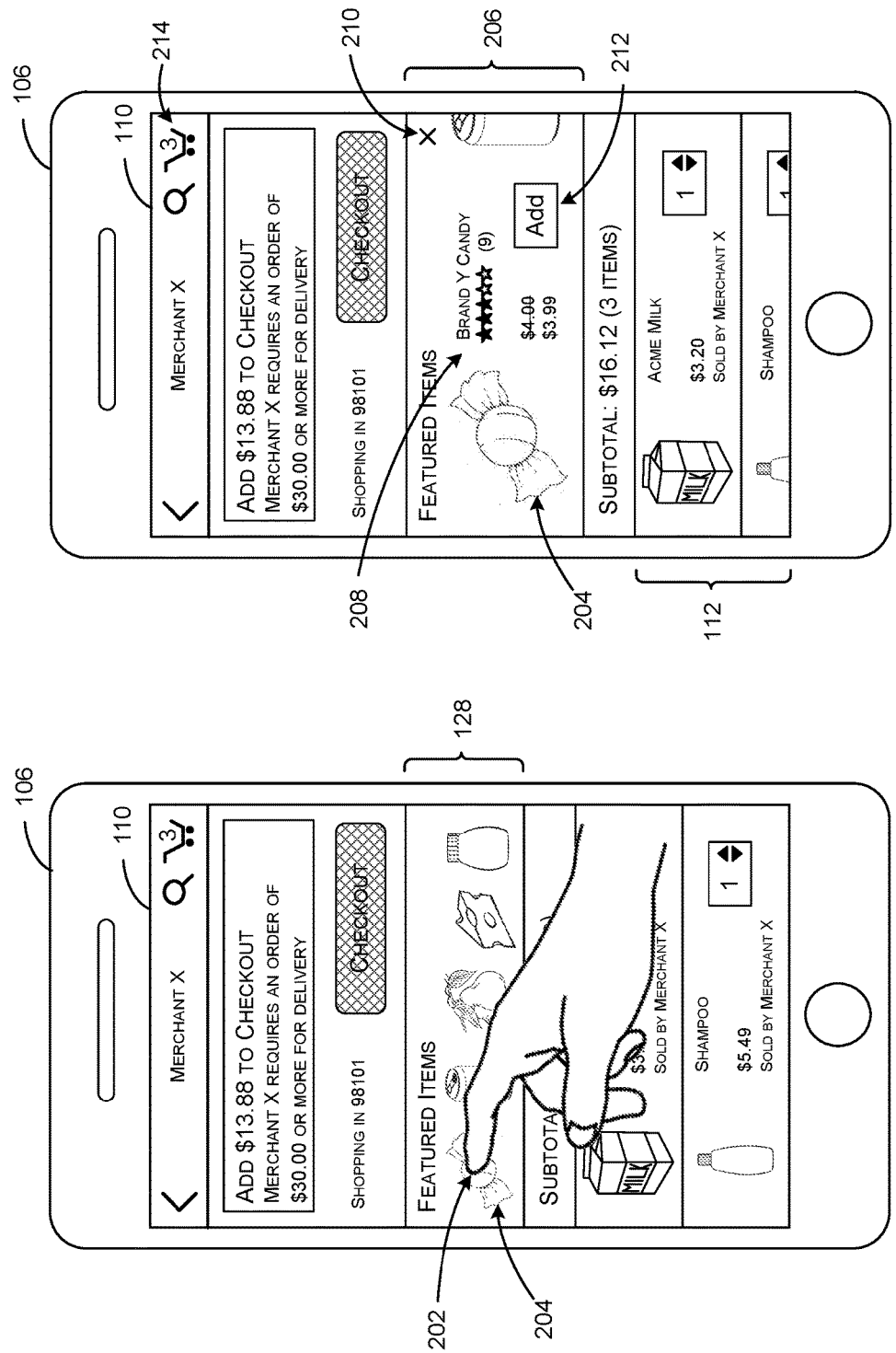

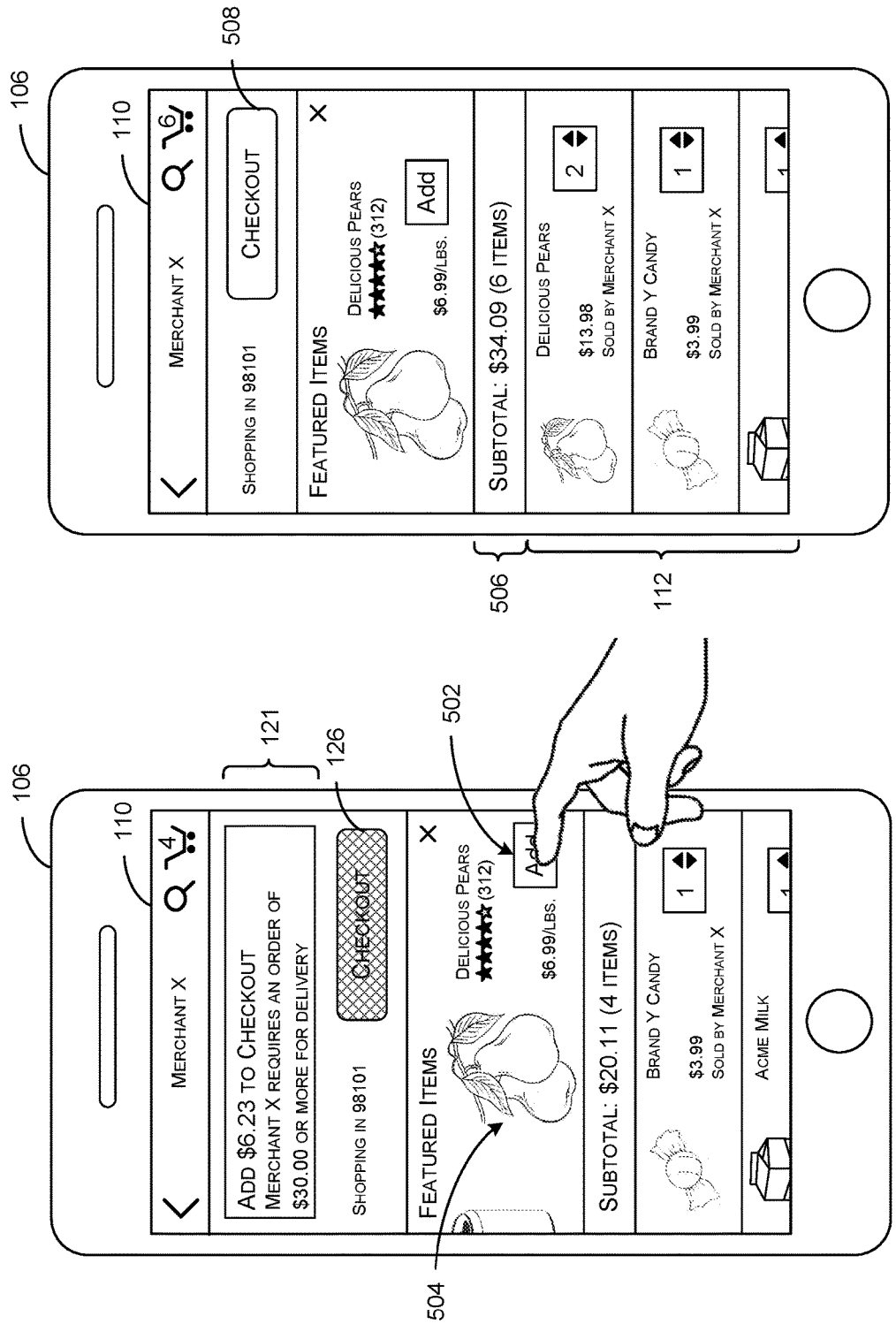

TECHNIQUES FOR PROVIDING ELECTRONIC ENDCAP ITEMS

BACKGROUND

Electronic marketplace providers may choose to provide particular user experiences, e.g., in a browser or mobile application environment, where customers may procure items within a shortened delivery period (e.g., two hours, four hours, one hour, etc.). In some cases, a seller may require that a customer commit to some threshold purchase, e.g. a minimum dollar amount, product count, or weight, before the order may be concluded. Current techniques prompt the user to add items to a shopping cart, and then require the user to return to search results, browsing lists or other item detail pages in order to select additional items in order to meet the threshold. As a result, the user is directed away from the page or screen presenting their cart. This redirection after one or more items have already been placed in the cart can create confusion and anxiety for the user, creating uncertainty as to where they are in the user experience or how they can navigate through the process to confirm a threshold has been met, and a purchase completed. The customer may become exasperated with the time-consuming nature of the process and may abandon his shopping cart. Thus, current techniques can lead to frustration for the customer resulting in a loss of revenue for the electronic marketplace provider. Embodiments of the invention discussed herein address these and other problems, individually and collectively.

BRIEF DESCRIPTION OF THE DRAWINGS

Various embodiments in accordance with the present disclosure will be described with reference to the drawings, in which:

FIGS. 2A and 2B are schematic diagrams illustrating another example environment suitable for implementing aspects of a fluid endcap engine, in accordance with at least one embodiment;

FIGS. 5A and 5B are schematic diagrams illustrating still one further example environment suitable for implementing aspects of a fluid endcap engine, in accordance with at least one embodiment;

DETAILED DESCRIPTION

Figure 1:
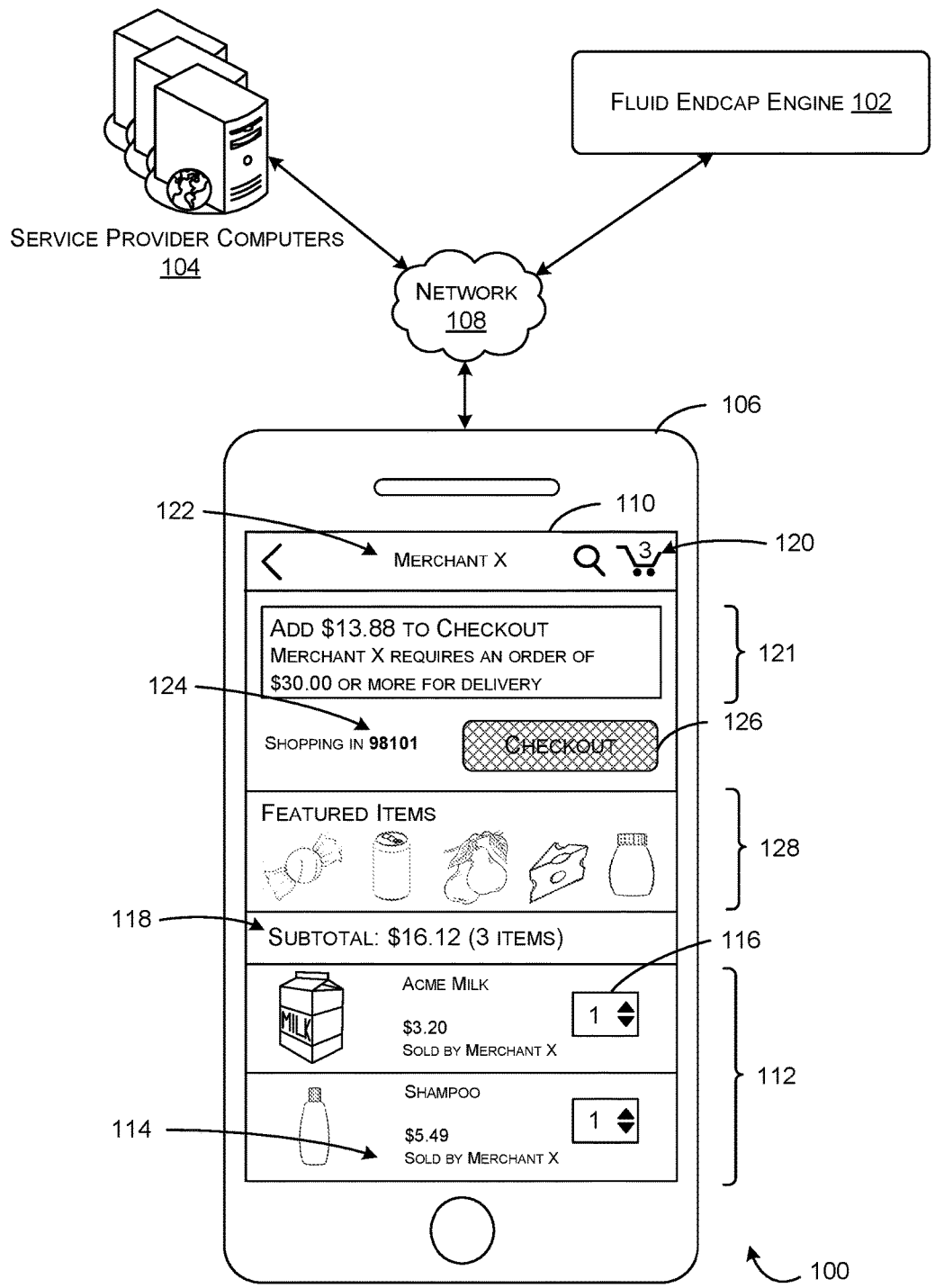
FIG. 1 is a schematic diagram illustrating an example environment suitable for implementing aspects of a fluid endcap engine, in accordance with at least one embodiment.

Techniques described herein are directed to providing item information (e.g., related to an item offered on an electronic marketplace) to a user utilizing a fluid endcap engine. In some examples, the electronic marketplace may be managed by one or more service provider computers (e.g., servers) that host electronic content in the form of an electronic catalog. In at least one embodiment, a user may navigate to a website of an electronic marketplace. For example, a user may utilize an application executing on his mobile device to access various network pages provided by the electronic marketplace provider. The user may access the electronic catalog (e.g., via the application) to browse for items, review/discuss items, and/or order/purchase items (e.g., physical items that may be stored in a warehouse or other location and/or electronic items that may be stored on a server and served to electronic devices). In a non-limiting example, the user may utilize the application to select an option to add an item to his shopping cart (e.g., a virtual placeholder network page utilized to collect item information for items the user intends to purchase). Upon adding one or more items, or at another suitable time, the user may be redirected to a network page that presents the user with the item(s) in his shopping cart. In some examples, the fluid endcap engine (e.g., managed by the electronic marketplace provider) may provide additional information to the user within the network page, such as a condition (e.g., related to a purchase amount, a quantity of items, a quantity of a particular item, a weight requirement, a temperate requirement, a volume requirement) to be met before the user may be allowed to complete his purchase. Utilizing the same network page, the fluid endcap engine may additionally, or alternatively, provide the user the ability to browse for other items offered by the merchant that is associated with the item(s) already in the user's cart. Additional items may be displayed on the same network page as the shopping cart items and the user may browse these additional items without leaving his shopping cart. Accordingly, the fluid endcap engine enables the user to identify items that will aid him in meeting the amount needed to complete his purchase while, at the same time, keeping the user engaged with the shopping cart.

In at least one embodiment, the user may be presented with a network page that displays the contents of his shopping cart. Within the same network page, a subtotal (e.g., a price, a quantity, a weight, a temperature, a volume, etc.) for his purchase may be provided. Additionally, or alternatively, an indication (e.g., a remainder value) can be provided of the condition, and of any remaining shortage that must be met in order to meet the condition before the user's transaction may be completed. The indication may be provided in textual form and/or may include a graphical representation (e.g., a bar, an image, etc.) of an amount still needed. As an example, it may be the case that a particular merchant requires a minimum purchase of $30 USD. If the user has placed an item that costs a total of $10, text (or a graphical element) may be displayed to indicate that the user needs to add at least $20 worth of items to the cart before he can purchase the items in his cart.

In at least one embodiment, the fluid endcap engine may be configured to identify, receive, or provide, a number of featured items within the network page. In some examples, the featured items may identified and/or related to the user's past-purchase history, browsing history, return history, and/or any suitable information related to the user. In some examples, the featured items may be related to, or identified based on, the items already contained in the cart and/or by price (e.g., in relation to a remainder amount and/or the subtotal). In some examples, the featured items may be related to, or identified based on, how popular an item is within the electronic marketplace (e.g., the item has been purchased over a threshold number of times by other users of the electronic marketplace). Further examples may be provided throughout this description related to information used by the fluid endcap engine to identify featured items. The featured items may be electronically provided to a user in a manner reminiscent of a physical endcap in a physical store. For example, much like a user in a physical store is presented items via endcaps near the checkout station, the electronic endcap (e.g., a featured items section of a network page) may be utilized to provide the featured items list within the same network page that provides shopping cart information. It should be appreciated that the fluid endcap engine may utilize any suitable combination of the examples discussed herein in order to provide a number of featured items within the same network page that provides the shopping cart information.

In at least one embodiment, the fluid endcap engine may provide an indication of a geographical location associated with the items of the shopping cart. By way of example, the fluid endcap engine may indicate a zip code with which the items are associated. The user may utilize the application to modify the zip code. For example, the fluid endcap engine may cause the geographical location to be set to the user's home zip code by default. The user's home zip code may be displayed on the same network page that is providing shopping cart information. The user may select an option to modify the zip code to, for example, the zip code associated with the user's current location. The fluid endcap engine may display the modified geographical location and may base further calculations (e.g., for determining related items, for calculating a sales tax amount, etc.) on the modified geographical location.

In at least one embodiment, the fluid endcap engine may provide an indication that the user may, or may not, complete his purchase. By way of example, the fluid endcap engine may present an interface element (e.g., a checkout button) that is disabled when the user has not met the threshold condition required for enabling a purchase. In other examples, the fluid endcap engine may simply not provide an interface element for completing the purchase until the user has met the threshold condition (e.g., a threshold amount). If a disabled interface element is utilized, the fluid endcap engine may enable the interface element to be selectable when, for example, the user has met the threshold condition. In at least one example, the fluid endcap engine may be further configured to modify various information previously displayed prior to the threshold condition being met. For example, upon determining that the threshold condition has been met, the fluid endcap engine may remove the display of the remainder value. In some examples, the fluid endcap engine may provide some textual or visual indication that the threshold condition has been met.

The techniques disclosed in at least one embodiment herein provide an efficient method of presenting item information, as well as an interface that enables the user to browse items, dive into details, and purchase them, all within the context of the shopping cart page or experience, aiding the user in meeting the minimum requirement(s) (e.g., a threshold condition) for a purchase while remaining within the shopping cart. Thus, users may no longer be forced to navigate away from the cart page through various other network pages of the electronic marketplace in order to identify additional items needed to meet a condition. Additionally, the electronic marketplace provider may realize benefits in reduced network traffic and resource utilization due to a reduction in users frequenting the marketplace to browse for such items.

The techniques described above and below may be implemented in a number of ways and in a number of contexts. Several example implementations and contexts are provided with reference to the following figures, as described below in more detail. However, the following implementations and contexts are but a few of many.

FIG. 1 is a schematic diagram illustrating an example environment 100 suitable for implementing aspects of a fluid endcap engine 102, in accordance with at least one embodiment. In at least one embodiment, the fluid endcap engine 102 may be operated, in whole or in part, as part of the service provider computers 104 and/or as part of an application executing on electronic device 106. In some examples, the fluid endcap engine 102, the service provider computers 104, and the electronic device 106 may be in communication with one another via network 108 (e.g., the Internet, a wireless cellular network, etc.).

In at least one embodiment, a user may navigate to a website of an electronic marketplace provided by the service provider computers 104. For example, a user may utilize an application executing on his mobile device (e.g., the electronic device 106) to access various network pages provided by the service provider computers 104. These network pages may provide item details for items offered within the electronic marketplace provider (e.g., by the electronic marketplace provider and/or by third-party merchants). The user may access the electronic catalog (e.g., via the application) to browse for items, review/discuss items, and/or order/purchase items. In a non-limiting example, the user may utilize the application to select an option to add an item to his shopping cart. Upon adding one or more items, or at another suitable time, the user may be redirected to network page 110 that may present the information and/or interface elements depicted in FIG. 1.

By way of example, the fluid endcap engine 102 may be configured to provide an item information section 112 within network page 110. The item information section 112 may depict electronic representations (e.g., images) and/or item information for one or more items that are currently associated with the user's shopping cart. Although the item information section 112 of FIG. 1 depicts images/information associated with two items, it should be appreciated that any suitable number of items may be associated with the shopping cart and ultimately be viewable within the item information section 112. In some examples, the user may select an area within the item information section 112 and navigate up or down to display other items associated with the shopping cart. By way of example, on an electronic device configured to receive touch input, the user may touch location 114 and drag his finger upward to view additional items in his shopping cart. Similarly, the user may drag his finger downward to navigate upward. It should be appreciated that any suitable mechanism for enabling the user to page and/or scroll through the shopping cart may be additionally, or alternatively, utilized. In some examples, the item information may include, but is not limited to, an image of the item, a name of the item, an item description, a rating associated with the item, one or more reviews associated with the item, a current price of the item, a discounted price of the item, a merchant identifier associated with the item, shipping information, promotional information, one or more hyperlinks from which any of the item information listed herein may be accessed, or any suitable information that may be associated with an item. Any suitable combination of the item information may be provided within the item information section 112, thus, the item information depicted in FIG. 1 is not intended to be limiting in nature.

In at least one embodiment, the fluid endcap engine 102 may provide interface element 116 and/or similar such interface elements. The interface element 116 may be provided to enable the user to modify a current quantity associated with an item (e.g., Acme milk) within the shopping cart. For example, the user may select the interface element 116 to cause a drop down menu to be displayed that provides a number of quantities from which the user may select. Upon selection of a particular quantity (e.g., 2), the interface element 116 may be updated to display the selected quantity. Although a drop down menu is provided in FIG. 1, any suitable interface element may be additionally or alternatively utilized such as an edit box, radio buttons, and the like in order to provide the user the ability to modify the quantity of an item within the shopping cart.

In at least one embodiment, the fluid endcap engine 102 may be configured to provide subtotal section 118. Within the subtotal section 118, the fluid endcap engine 102 may provide a subtotal amount indicating a total cost for the items currently associated with the shopping cart (e.g., $16.12). Additionally, or alternatively, the fluid endcap engine 102 may provide a count indicating how many items are currently associated with the shopping cart (e.g., 3, 7, 10, etc.). The fluid endcap engine 102 may additionally, or alternatively, provide the count as a graphical element as depicted by graphical element 120 (e.g., a shopping cart icon indicating that 3 items are currently assocaited with the shopping cart).

In at least one embodiment, the fluid endcap engine 102 may be configured to provide condition information section 121. Within condition information section 121, the fluid endcap engine 102 may provide graphical (e.g., a bar, a pie chart, etc.) and/or textual information associated with a condition that may be required to be met before completion of an order may take place. By way of example, a merchant (e.g., merchant X, indicated within the network page 110 at location 122) may require that a threshold condition (e.g., a minimum total purchase amount of, for example, $30.00) be met and/or exceeded before an order may be completed. The condition information section 121 of FIG. 1 is intended to depict textual information associated with the condition that the user purchases at least $30.00 within a single order. The fluid endcap engine 102 may provide a remainder value (e.g., $13.88) within the condition information section 121. A remainder value is intended to refer to an additional additional monetary amount (and/or in some cases an additional number of items) needed before completion of the order may be enabled. In the example depicted in FIG. 1, the fluid endcap engine 102 may calculate the remainder value $13.88 by determining a difference between a subtotal amount (e.g., $16.12) and a threshold condition associated with merchant X (e.g., a minimum total purchase amount of $30.00). In at least one embodiment, as the user adds or substracts items from his shopping cart, the fluid endcap engine 102 may be configured to update the subtotal and/or remainder value accordingly. Although examples herein provide monetary-based conditions, it should be appreciated that a condition may additionally or alternatively be related to a required number of items, a required quantity for a particular item, or any suitable condition that may be required by a merchant before completion of the order may be allowed.

In at least one example, the fluid endcap engine 102 may provide an indiciation of a geographical region associated with the information provided within the network page 110. As a non-limiting example, merchant X may offer various items depending on a geographical region. For example, perhaps Acme milk is provided with a first geographical region (e.g., zip code 98101), while a different brand of milk is provided within a second geographical region (e.g, zip code 98188). Any information depicted within the network page 110 may, in some cases, be determined and/or provided based on the geographical region. Additionally, or alternatively, the fluid endcap engine 102 may utilize the geographical region for purposes of calculating sales tax and/or for determining the price associated with respective items of the shopping cart. The fluid endcap engine 102 may be configured to provide the user the ability to modify the geographical region. For example, the geographical region may be indicated using a zip code, a city, a state, a map, or the like. In the example depicted in FIG. 1, the user may select zip code text 124 to modify the geographical region. Although not depicted, an edit box, radio button, map, hyperlink and/or the like may be additionally or alternatively provided by the fluid endcap engine 102 via the network page 110 to enable the user to modify the geographical region associated with the shopping cart.

In at least one embodiment, the fluid endcap engine 102 may provide interface element 126 (e.g., a checkout button). The interface element 126 may provide the user with the ability to proceed with the transaction (e.g., purchase the items and/or otherwise complete the order). In at least one example, the fluid endcap engine 102 may be configured to inhibit the selection of the interface element 126 when the threshold condition has not been met. In other words, in the example depicted in FIG. 1, the interface element 126 may be disabled/unselectable because the user's shopping cart does not yet include items that total at least $30.00. In at least one example, the fluid endcap engine 102 may enable the interface element 126 to be enabled/selectable when the items in the cart total at least $30.00.

In at least one embodiment, the fluid endcap engine 102 may provide a featured items section 128. The featured items section 128 may depict a portion of item information corresponding to a number of featured items. In some examples, the fluid endcap engine 102 may identify particular items to provide within the featured items section 128 from an electronic marketplace catalog. In at least one example, the items included within the featured items section 128 may share a common offeror (e.g., merchant X). The fluid endcap engine 102 may determine the featured items based on any suitable combination of factors including, but not limited to, the user's past-purchase history, the user's navigational history (within the electronic marketplace as a whole and/or with the featured items section 128), the current subtotal for the shopping cart, the condition and/or remainder value indicated within the condition information section 121, a popularity associated with an item (e.g., the item has been ordered over a threshold number of times by other users of the marketplace), or the like. In at least one embodiment, the fluid endcap engine 102 may be configured to update the items included within the featured items section 128 based on the user's interaction with the featured items section 128. The fluid endcap engine 102 may be configured to provide the user the ability to navigate within the featured items section 128 to display additional featured items, to view additional information for particular items, to add an item from the featured items section 128 to the shopping cart, and the like. These navigational aspects may be discussed further with respect to the proceeding figure descriptions.

FIGS. 2A and 2B are schematic diagrams illustrating another example environment suitable for implementing aspects of a fluid endcap engine 102 of FIG. 1, in accordance with at least one embodiment. For example, FIG. 2A is intended to depict the featured items section 128 of FIG. 1 within the network page 110 utilizing the electronic device 106. In at least one embodiment, the user may select location 202 within the featured items section 128. Location 202 may be associated with a particular item (e.g., item 204, brand Y candy) of a featured items list. In the example depicted, the location 202 is associated with an image of item 204. Upon receiving an indication that the user has selected the location 202 (e.g., either by touch or mouse click), the fluid endcap engine 102 may be configured to provide an expanded view of the item 204 and/or expanded view of one or more items of the featured items list.

By way of example, FIG. 2B is intended to depict an expanded view of the item 204 within an expanded view section 206 of the network page 110 provided to the electronic device 106. The expanded view section 206 may provide more item information than what was provided within the featured items section 128 of FIGS. 1 and 2A. In at least one example, the fluid endcap engine 102 may resize the item information section 112 to accommodate the expanded view section 206. As depicted in FIG. 2B, the fluid endcap engine 102 may decrease an area utilized for the item information section 112 in order to provide space to display the expanded view section 206.

In at least one example, the featured items section 128 may have depicted only an image of the item 204 (or some subset of information related to the item 204) while the expanded view of the item 204 may provide additional item information 208 including, but not limited to, a title associated with the item (e.g., brand Y candy), a review rating (indicated with stars as depicted, and/or, a number, a percentage, etc.), an indication of a number of reviews that contributed to the review rating (e.g., 9), an listing price (e.g., $4.00), a discounted price (e.g., $3.99), or the like. It should be appreciated that any suitable combination of item information may be provided by the fluid endcap engine 102 for display within the expanded view section 206.

In at least one embodiment, the fluid endcap engine 102 may provide interface element 210 within the expanded view section 206. The interface element 210 may be provided to enable the user to collapse the expanded view section 206. In at least one example, upon receiving an indication that the interface element 210 has been selected, the fluid endcap engine 102 may be configured to replace expanded view section 206 with the featured items section 128, depicting a collapsed view of the items associated with the featured items list.

In at least one embodiment, the fluid endcap engine 102 may be configured to provide interface element 212 (e.g., an add button associated with a particular item). In at least one example, upon receipt of an indication that the interface element 212 has been selected, the fluid endcap engine 102 may be configured to associate the item with the shopping cart. Upon associating the item (e.g., the item 204) with the shopping cart, the fluid endcap engine 102 may be configured to display item information corresponding to the added item within the item information section 112. In at least one example, the item 204 may be added to the set of items associated with the shopping cart but might not be displayed immediately (e.g., for example, if the item is added to the end of the shopping cart list, or at least a position within the shopping cart list that is not currently being displayed). Although not depicted, the fluid endcap engine 102 may be configured to provide additional/alternative interface elements within the expanded view section 206 that enable the user to associate the item with additional lists that are different than the shopping cart list. For example, the fluid endcap engine 102 may provide an interface element that enables a user to add an item to a wish list (e.g., a default wish list, a "favorites" wish list, a wish list for which the name is user configurable, etc.).

Figures 3A, 3B:
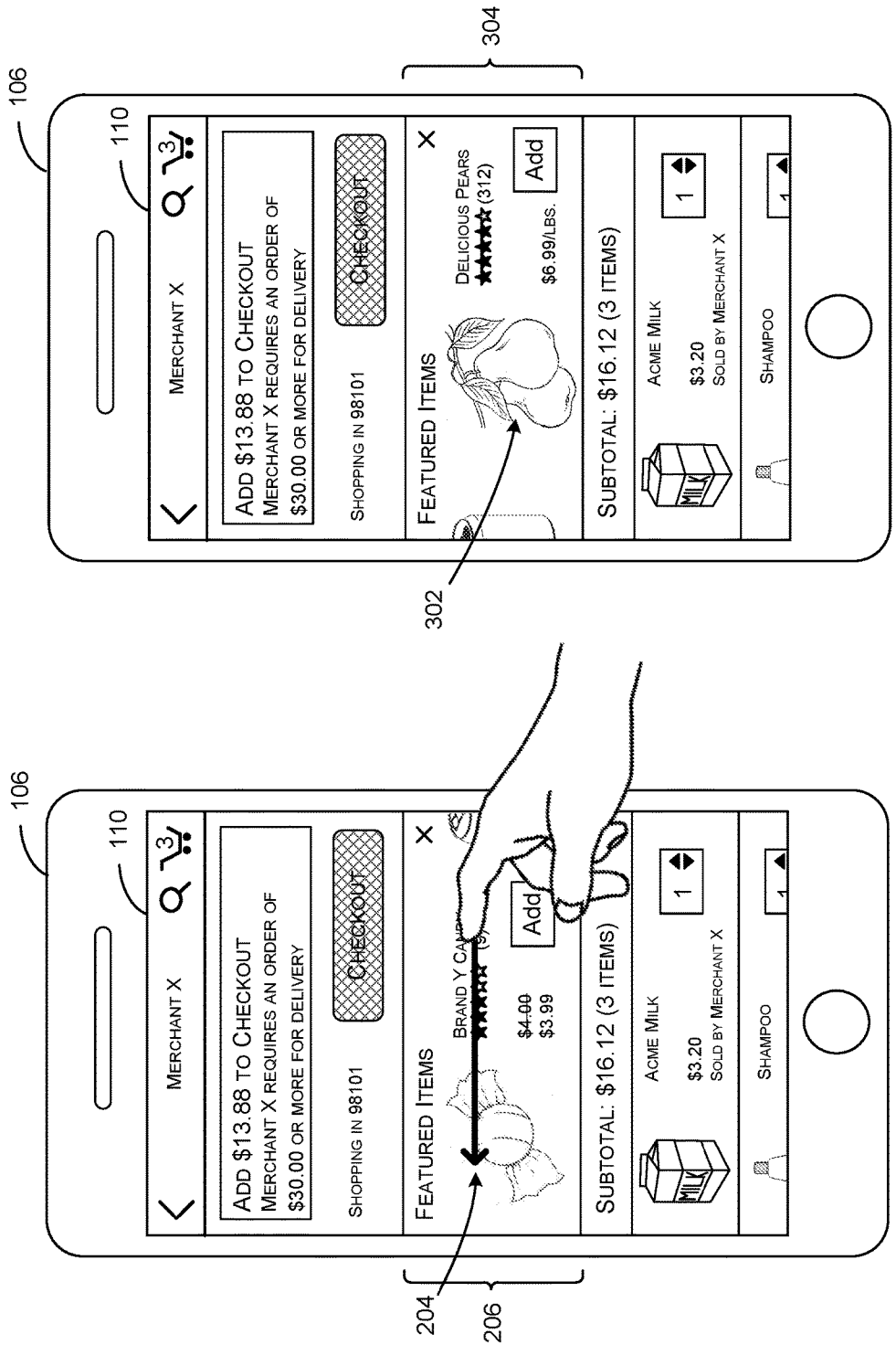
FIGS. 3A and 3B are schematic diagrams illustrating an additional example environment suitable for implementing aspects of a fluid endcap engine, in accordance with at least one embodiment.

FIGS. 3A and 3B are schematic diagrams illustrating an additional example environment suitable for implementing aspects of a fluid endcap engine, in accordance with at least one embodiment. The fluid endcap engine 102 may be configured to receive navigational requests from the user via the network page 110 provided to the electronic device 106. FIG. 3A depicts the expanded view section 206 discussed above in connection with FIG. 2B. The user may touch (or mouse click) a location within the expanded view section 206 and drag his finger/mouse cursor to scroll/page through the set of items contained in the featured items list. By way of example, the user may touch a particular location within the expanded view section 206. While maintaining contact, the user may drag his finger to the left as indicated by arrow 302. The fluid endcap engine 102 may be configured to receive a navigational request that indicates the interaction of the user with the expanded view section 206. In response, the fluid endcap engine 102 may be configured to provide a corresponding depiction of scrolling through the featured items list. The scrolling may depend on a speed at which the user drags his finger/mouse cursor. In some examples, the user may flick his finger in a particular direction within the expanded view section 206. Upon receipt of a navigational request indicating a flick in a particular direction, the fluid endcap engine 102 may be configured to adjust the scrolling speed of the featured items list and/or provide a page-like scrolling feature instead of a continuous scrolling feature. In other words, a drag action may provide a continuous scrolling action, whereas a flick may cause the first x number of items of the featured item list to be replaced with the next x number of items in the list. Although discussed in the context of the expanded view section 206, it should be appreciated that these same navigational options may be provided via the featured items section 128 of FIGS. 1 and 2A.

As a non-limiting example, upon receiving indication(s) that the user has selected an area within the expanded view section 206, the fluid endcap engine 102 may scroll through the featured items (e.g., to subsequent items in the list). For example, after scrolling to the left, the fluid endcap engine 102 may provide the user of item information associated with item 302 of FIG. 3B. In at least one example, navigating through the featured items list may maintain an expanded view as is depicted by expanded view section 304. However, in some examples, a navigational request may cause the fluid endcap engine 102 to replace the expanded view section 304 with a collapsed view similar to that depicted in item information section 112 of FIGS. 1 and 2A.

Figures 4A, 4B:
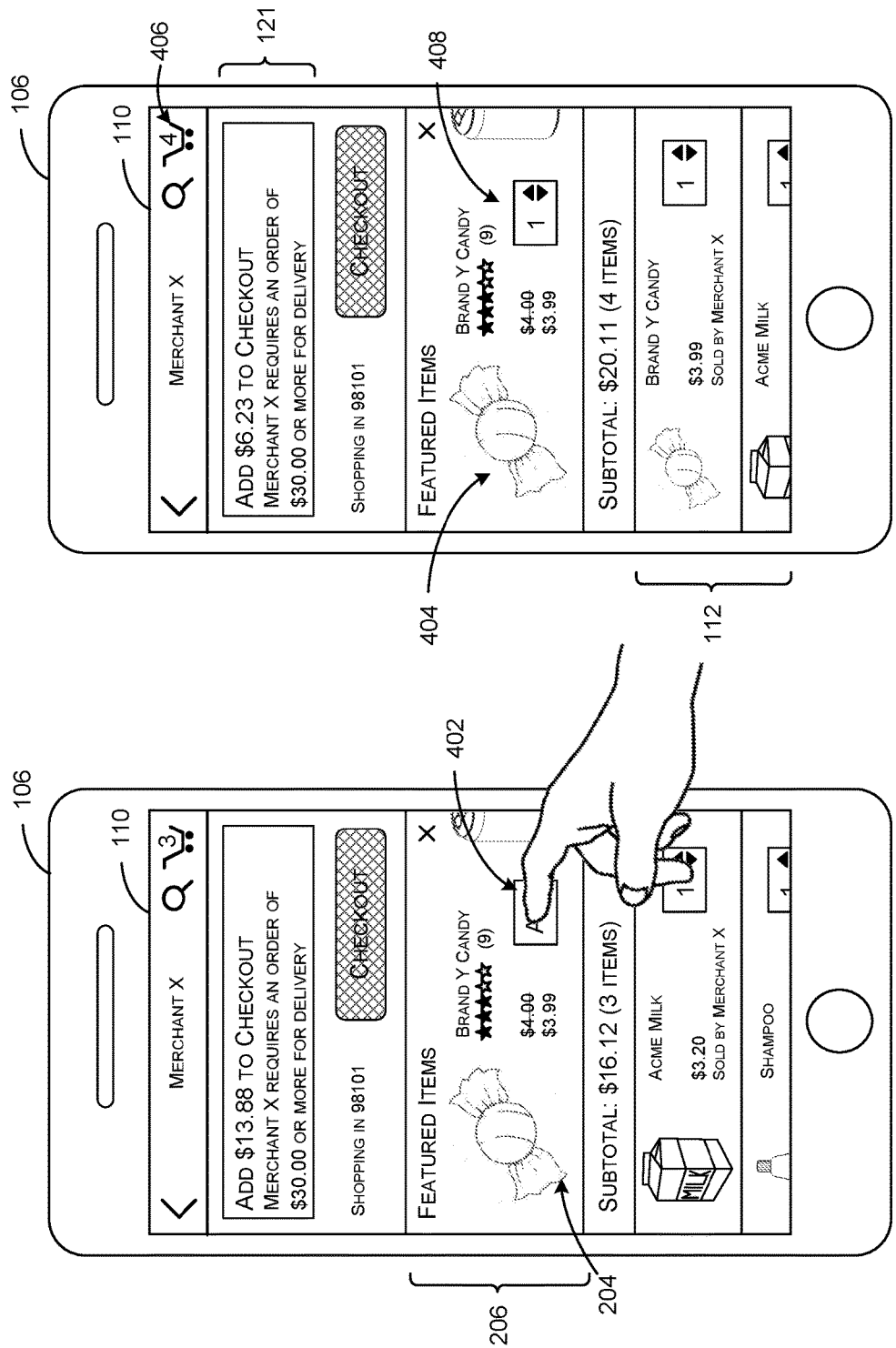
FIGS. 4A and 4B are schematic diagrams illustrating one further example environment suitable for implementing aspects of a fluid endcap engine, in accordance with at least one embodiment.

FIGS. 4A and 4B are schematic diagrams illustrating one further example environment suitable for implementing aspects of a fluid endcap engine 102 of FIG. 1, in accordance with at least one embodiment. Together, FIGS. 4A and 4B are intended to depict the cause and effect of adding an item to the shopping cart from the expanded view section 206. In FIG. 4A, the user may select interface element 402 (e.g., the interface element 212 of FIG. 2B). Upon receiving indication that the user has selected the interface element 402, the fluid endcap engine 102 may be configured to associate the item 204 with the shopping cart.

Additionally, or alternatively, the fluid endcap engine 102 may be configured to enable the user to drag and drop a representation of the item 204 into the area of the network page 110 occupied by the item information section 112 or to a graphical element such as graphical element 214 (e.g., the graphical element 120 of FIG. 1). Either action may cause the fluid endcap engine 102 to add the dropped item to the set of items associated with the shopping cart. It should be appreciated that a drag and drop action may be initiated from a collapsed view of the featured items section (e.g., as depicted by the featured items section 128) or from an expanded view of the featured items section as depicted by expanded view section 206.

FIG. 4B is intended to depict the resulting update to the network page 110 after adding the item 204 to the shopping cart. In at least one example, the item 204 may appear at a first position within the shopping cart list. Accordingly, the fluid endcap engine 102 may cause item information corresponding to the item 204 within the item information section 112. In at least one example, the item 204 may remain in the expanded view section 206 as depicted at 404. In at least one example, the item 204 may be removed from the featured items list and the network page 110 updated accordingly.

In at least one example, the fluid endcap engine 102 may be configured to update a subtotal displayed within the network page 110, the subtotal being related to a current combined price, a combined quantity, a combined weight, a combined temperature requirement, a combined volume, or the like. Additionally, or alternatively, the fluid endcap engine 102 may be configured to update a graphical element (e.g., the graphical element 406) provided as part of the network page 110 to indicate a current number of items associated with the shopping cart. As items are added to or removed from the shopping cart, the fluid endcap engine 102 may update the network page 110 with respect to a subtotal, a remainder value associated with the condition, a graphical element such as the graphical element 406, the list of featured items provided within a featured items section, or any suitable information provided within network page 110.

In at least one example, the fluid endcap engine 102 may be configured to remove the interface element 402 from display. By way of example, upon determining that an item has been added to the shopping cart (e.g., the brand Y candy), the fluid endcap engine 102 may remove the interface element 402 from display and replace it with the interface element 408. In some examples, the fluid endcap engine 102 may present the interface element 402 together with the interface element 408 on the network page 110.

FIGS. 5A and 5B are schematic diagrams illustrating still one further example environment suitable for implementing aspects of a fluid endcap engine 102 of FIG. 1, in accordance with at least one embodiment. Together, FIGS. 5A and 5B are intended to depict the cause and effect of meeting a condition associated with a potential order. For example, condition information may be provided by the fluid endcap engine 102 within the condition information section 121 of the network page 110 provided to the electronic device 106. Upon selecting the interface element 502 (e.g., the interface element 402 of FIG. 4), the fluid endcap engine 102 may associated the item 504 with a set of items associated with the user's shopping cart. In a manner similar to that described above with respect to FIGS. 4A and 4B, the fluid endcap engine 102 may depict item information associated with the item 504 within the item information section 112 as depicted in FIG. 5B.

In at least one embodiment, the fluid endcap engine 102 may determine that the current contents of the shopping cart meet a condition associated with the merchant. For example, the condition information section 121 may indicate that the condition is that the subtotal for the items in the shopping cart should meet or exceed a monetary amount (e.g., $30.00). In response to associating the item 504 with the set of items in the shopping cart, the fluid endcap engine 102 may calculate a new subtotal (e.g., $34.09) and display the new subtotal in the subtotal section 506 of the network page 110. The fluid endcap engine 102 may further be configured to determine that the condition has been met. For example, the fluid endcap engine 102 may determine that the subtotal exceeds the threshold condition (e.g., the minimum total purchase amount of $30.00). Accordingly, the fluid endcap engine 102 may be configured to remove the display of the condition information section 121. In some examples, the fluid endcap engine 102 may instead cause the condition information section 121 to be updated to indicate that the condition has been met (e.g., by displaying text that informs the user that the condition has been met).

In at least one embodiment, the fluid endcap engine 102 may be configured to provide enabled interface element 508 in response to determining that the condition has been met by the items currently associated with the shopping cart. In some examples, the fluid endcap engine 102 may be configured to inhibit display of interface element 126 entirely when the condition has not been met and instead provide enabled interface element 508 only after determining that the condition has been met.

Figure 6:
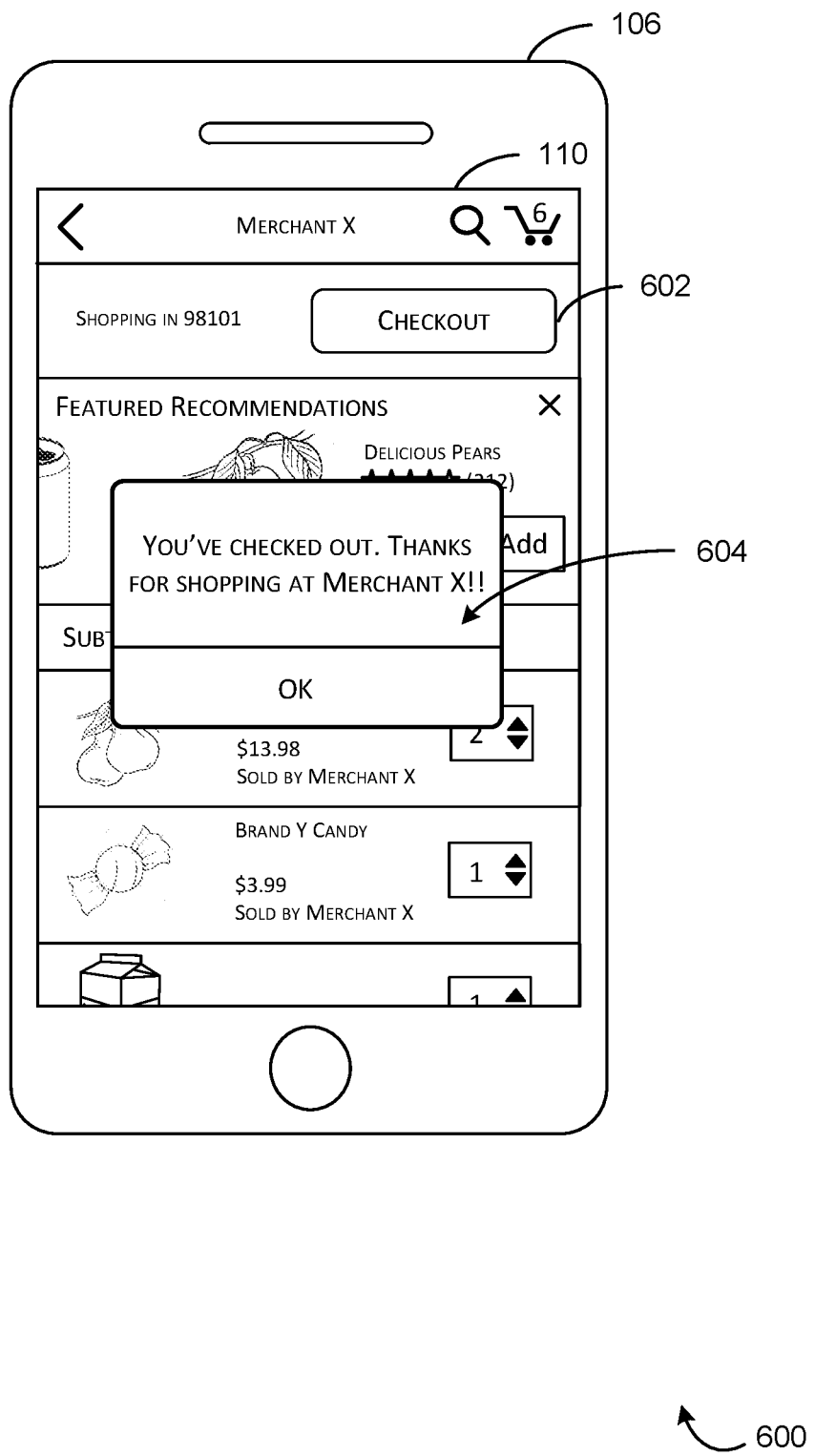
FIG. 6 is a schematic diagram illustrating yet another example environment suitable for implementing aspects of a fluid endcap engine, in accordance with at least one embodiment.

FIG. 6 is a schematic diagram illustrating yet another example environment 600 suitable for implementing aspects of a fluid endcap engine, in accordance with at least one embodiment. Upon receiving an indication that the interface element 602 (e.g., enabled interface element 508 of FIG. 5B) has been selected by the user, the fluid endcap engine 102 may be configured to prompt the user for billing and/or shipping information. The prompt may be provided by the fluid endcap engine 102 as a pop-up window visually overlaid over the network page 110. In at least some examples, the fluid endcap engine 102 may cause another network page to be provided in order to collect billing and/or shipping information. In at least one embodiment, the fluid endcap engine 102 may store billing and/or shipping information (e.g., as part of a user profile associated with the user). The fluid endcap engine 102 may be configured to utilize the stored billing and/or shipping information to complete the order, in some cases, without prompting the user for additional information and/or confirmation. In at least one example, the fluid endcap engine 102 may be configured to provide an indication (e.g., pop-up window 604) to inform the user that the user that a check out procedure has been concluded (e.g., the user has been charged for the items in the shopping cart and the items will be shipped to the user).

Although not depicted, the fluid endcap engine 102 may be configured to provide a different network page to display completed order information such as the items that have been purchased, the billing information used to purchase the items, the intended shipping address, an intended delivery date/time/range, or the like.

It should be appreciated that any information provided utilizing the network page 110, may be formatted in a same or different manner than depicted in the above figures. For example, the layout of the network page 110 as depicted, the corresponding areas of the various sections depicted, the size and/or shape of the graphical elements provided, are all intended to be illustrative in nature.

Figure 7:
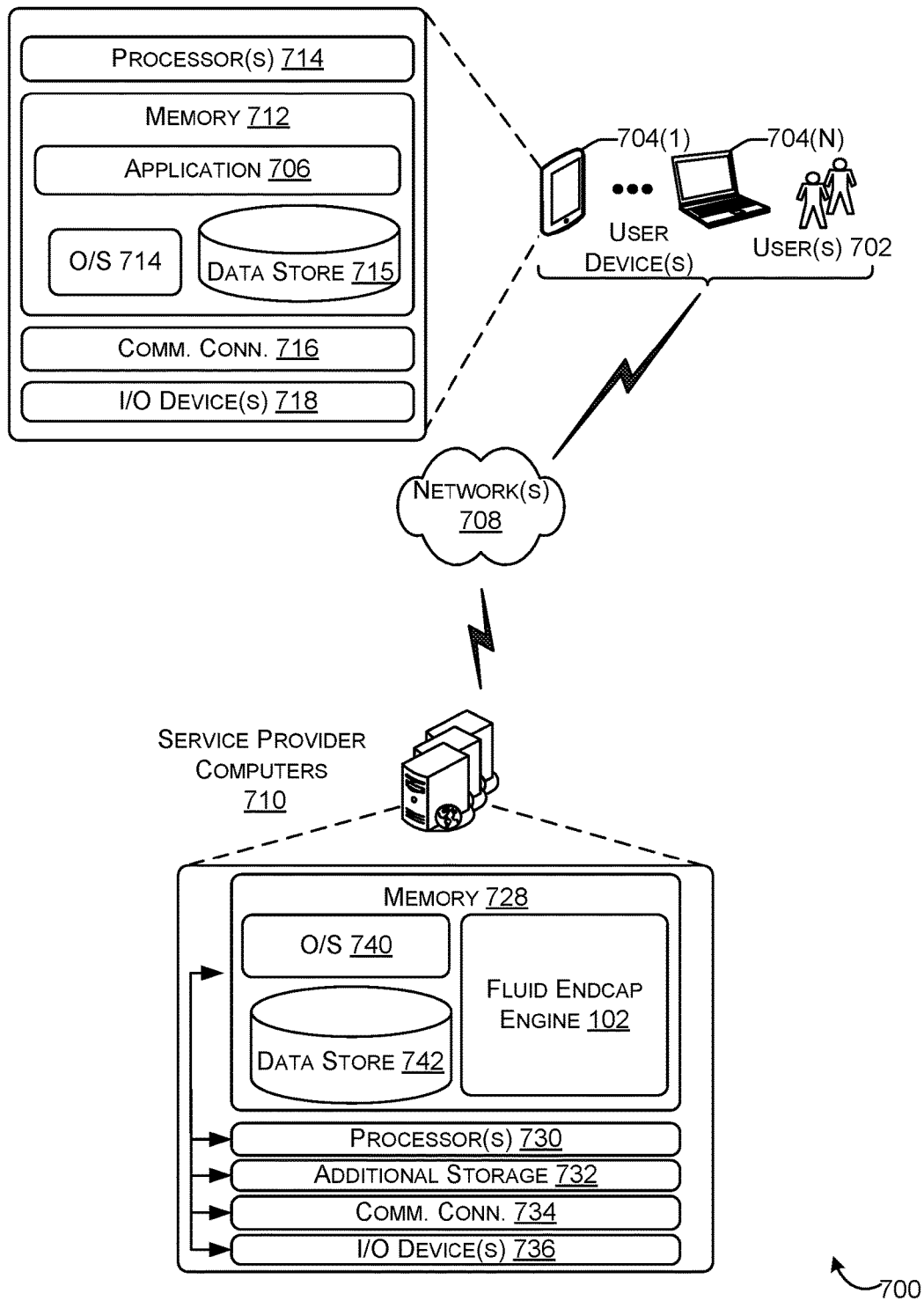
FIG. 7 illustrates components of a fluid endcap system according to a particular embodiment.

FIG. 7 illustrates components of a system 700 according to a particular embodiment. In system 700, one or more users 702 may utilize a user device (e.g., a user device of a collection of user devices 704(1)-(N) (collectively, user devices 704) to navigate to a network page provided by the service provider computers 710 (e.g., service provider computers 104 of FIG. 1). For example, the user may access a user interface accessible through an application 706 running on the user devices 704 via one or more networks 708. In some aspects, the application 706 operating on the user devices 704 may be hosted, managed, and/or provided by a computing resources service or service provider, such as by utilizing one or more service provider computers 710.

In some examples, the networks 708 may include any one or a combination of many different types of networks, such as cable networks, the Internet, wireless networks, cellular networks, and other private and/or public networks. While the illustrated example represents the users 702 accessing application functionality over the networks 708, the described techniques may equally apply in instances where the users 702 interact with the service provider computers 710 via the one or more user devices 704 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 706 may allow the users 702 to interact with the service provider computers 710 so as to provide the various functionality described above. For example, a user may utilize the application 706 to browse for various items in the electronic marketplace. In at least one example, the application 706 may provide a network page with which the users 702 may view their respective shopping carts. The application 706 may be configured to provide a subtotal, a remainder amount (or graphical representation of a remainder amount), a geographical location associated with the shopping cart, one or more related items or any suitable combination of the information described in the above figures. The application 706 may be configured to provide such information within the same network page that is being provided to present shopping cart information.

The service provider computers 710, perhaps arranged in a cluster of servers or as a server farm, may host the application 706 operating on the user devices 704 and/or cloud-based software services. Other server architectures may also be used to host the application 706 and/or cloud-based software services. The application 706 operating on the user devices 704 may be capable of handling requests from the users 702 and serving, in response, various user interfaces that can be rendered at the user devices 704. The application 706 operating on the user devices 704 can present any suitable type of website that supports user interaction, including search engine sites, item detail pages, shopping cart network pages such as the network page 110, and the like. The described techniques can similarly be implemented outside of the application 706, such as with other applications running on the user devices 704.

The user devices 704 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 704 may be in communication with the service provider computers 710 via the networks 708, or via other network connections.

In one illustrative configuration, the user devices 704 may include at least one memory 712 and one or more processing units (or processor(s)) 714. The processor(s) 714 may be implemented as appropriate in hardware, computer-executable instructions, firmware, or combinations thereof. Computer-executable instruction or firmware implementations of the processor(s) 714 may include computer-executable or machine-executable instructions written in any suitable programming language to perform the various functions described.

The memory 712 may store program instructions that are loadable and executable on the processor(s) 714, as well as data generated during the execution of these programs. Depending on the configuration and type of user computing device, the memory 712 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 712 may include multiple different types of memory, such as static random access memory (SRAM), dynamic random access memory (DRAM), or ROM.

Turning to the contents of the memory 712 in more detail, the memory 712 may include an operating system 714, one or more data stores 715, and one or more application programs, modules, or services for implementing the features of the fluid endcap engine 102 disclosed herein, provided via the application 706 (e.g., a browser application, an electronic marketplace shopping application, etc.). The application 706 may be configured to receive, store, and/or display a network page or other interface for interacting with the service provider computers 710. Additionally, the memory 712 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 704 may also contain communications connection(s) 716 that allow the user devices 704 to communicate with a stored database, another computing device or server (e.g., the service provider computers 710), user terminals and/or other devices on the networks 708. The user devices 704 may also include I/O device(s) 718, such as a keyboard, a mouse, a pen, a voice input device, a touch input device, a display, speakers, a printer, etc.

In some aspects, the service provider computers 710 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 710 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 710 may be in communication with the user devices 704 and/or other service providers via the networks 708 or via other network connections. The service provider computers 710 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computers 710 may include at least one memory 728 and one or more processing units (or processor(s)) 730. The processor(s) 730 may be implemented as appropriate in hardware, computer-executable instructions, firmware, or combinations thereof. Computer-executable instruction or firmware implementations of the processor(s) 730 may include computer-executable or machine-executable instructions written in any suitable programming language to perform the various functions described.

The memory 728 may store program instructions that are loadable and executable on the processor(s) 730, as well as data generated during the execution of these programs. Depending on the configuration and type of service provider computers 710, the memory 728 may be volatile (such as RAM) and/or non-volatile (such as ROM, flash memory, etc.). The service provider computers 710 or servers may also include additional storage 732, which may include removable storage and/or non-removable storage. The additional storage 732 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 728 may include multiple different types of memory, such as SRAM, DRAM, or ROM.

The memory 728, the additional storage 732, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 728 and the additional storage 732 are all examples of computer storage media. Additional types of computer storage media that may be present in the service provider computers 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 710. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 710 may also contain communications connection(s) 734 that allow the service provider computers 710 to communicate with a stored database, another computing device or server, user terminals and/or other devices on the networks 708. The service provider computers 710 may also include I/O device(s) 736, such as a keyboard, a mouse, a pen, a voice input device, a touch input device, a display, speakers, a printer, etc.

Turning to the contents of the memory 728 in more detail, the memory 728 may include an operating system 740, one or more data stores 742, and/or one or more application programs, modules, or services for implementing the features disclosed herein, such as the features provided by the fluid endcap engine 102.

Figure 8:
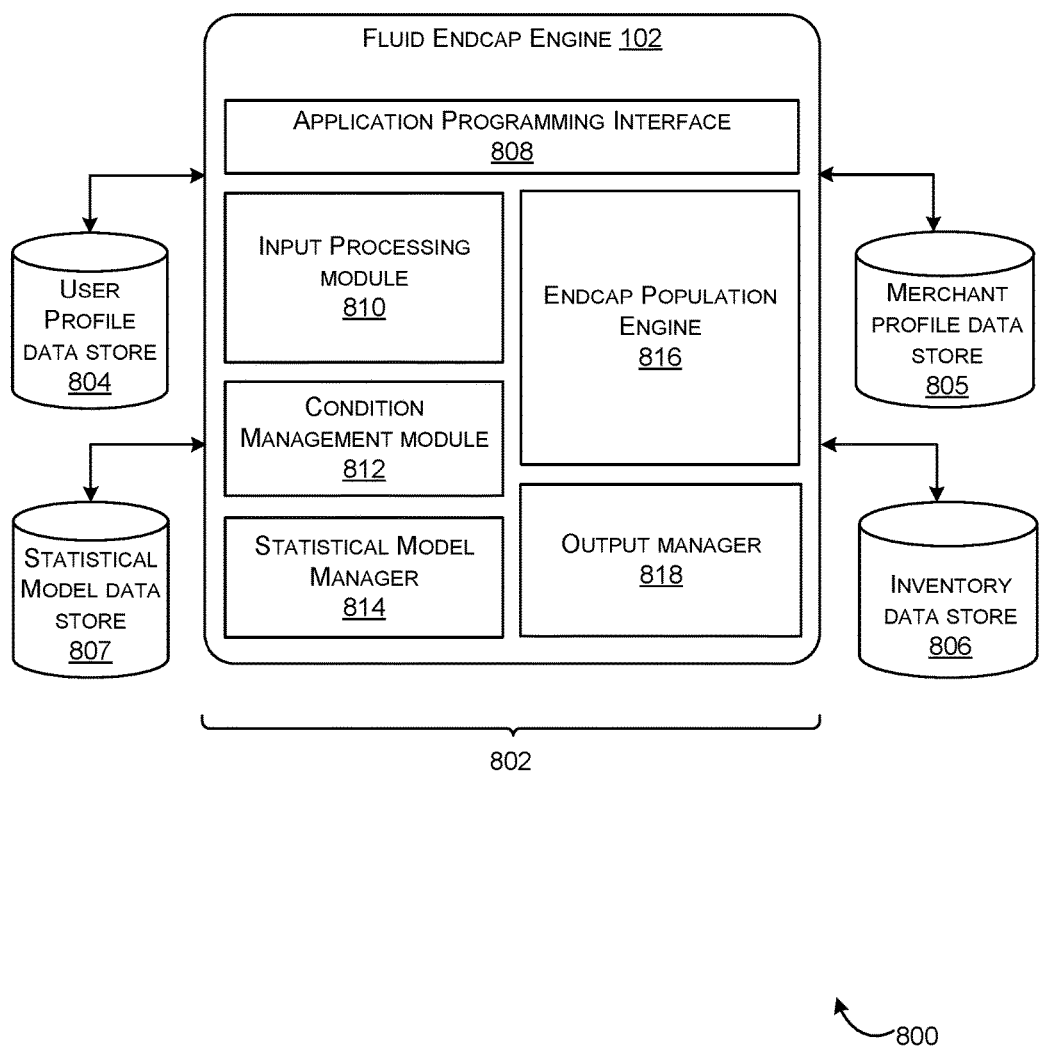
FIG. 8 is a schematic diagram of an example computer architecture for the fluid endcap engine, including a plurality of modules that may perform functions in accordance with at least one embodiment.

FIG. 8 is a schematic diagram of an example computer architecture 800 for the fluid endcap engine 102 of FIG. 1, including a plurality of modules 802 that may perform functions in accordance with at least one embodiment. The modules 802 may be software modules, hardware modules, or a combination thereof. If the modules 802 are software modules, the modules 802 can be embodied on a computer readable medium and processed by a processor in any of the computer systems described herein. It should be noted that any module or data store described herein, may be, in some embodiments, be a service responsible for managing data of the type required to make corresponding calculations. The modules 802 may be exist as part of the fluid endcap engine 102 operating on the service provider computer(s) 710 of FIG. 7, or the modules may exist as separate modules or services external to the service provider computer(s) 102 (e.g., as part of the application 706 of FIG. 7 operating on the user devices 704 of FIG. 7).

In the embodiment shown in the FIG. 8, a user profile data store 804, a merchant profile data store 805, an inventory data store 806, and a statistical model data store 807 are shown, although data can be maintained, derived, or otherwise accessed from various data stores, either remote or local to the fluid endcap engine 102, to achieve the functions described herein. In at least one embodiment, the data stores described herein may be physically located on the user device(s) 704 or alternatively, any suitable combination of the data stores may be operated as part of the service provider computers 710, for example, as part of a fluid endcap service. The fluid endcap engine 102, as shown in FIG. 8, includes various modules such as an application programming interface 808, an input processing module 810, a condition management module 812, a statistical model manager 814, an endcap population engine, and an output manager 718. Some functions of the modules 808, 810, 812, 814, 816, and 818 are described below. However, for the benefit of the reader, a brief, non-limiting description of each of the modules is provided in the following paragraphs. In accordance with at least one embodiment, a process is enabled for providing item information with a network page associated with a shopping cart.

In at least one embodiment, the fluid endcap engine 102 includes the application programming interface 808. Generally, the application programming interface 808 may be utilized to receive and/or provide any suitable information to and/or from the fluid endcap engine 102 (or modules of the fluid endcap engine 102) with respect to any example provided herein.

In the embodiment shown in the drawings, the input processing module 810, a component of the fluid endcap engine 102, may be configured to receive any suitable information from, for example, the application 706. In some cases, the input processing module 810 may be configured to receive information related to user activity within the electronic marketplace. The information received by the input processing module 810 may correspond to a variety of actions performed by a user utilizing the application 706 of FIG. 7. As a non-limiting example, the input processing module 810 may receive navigational requests to navigate within various sections provided within the network page 110 discussed above. Such navigational requests may indicate that the user wishes to navigate through items associated with the shopping cart. In some examples, the navigational requests may be indicative of the user's desire to navigate within a featured items section of the network page 110. The input processing module 810 may be configured to store such navigational requests in, for example, a user profile associated with the user and stored in the user profile data store 804, a data store configured to store such information. The input processing module 810 may store any suitable information that indicates one or more navigational actions taken by the user, such as interface element selections, scrolling actions, paging actions, cart additions and/or removals, or the like.

In at least one embodiment, the input processing module 810 may receive item information associated with a set of items of a shopping cart. In some examples, the input processing module 810 may receive item information directly from the application 706 (e.g., an item identifier, item attributes, etc.). Additionally, or alternatively, the input processing module 810 may obtain item information for an item from the inventory data store 806, a data store configured to store a catalog of items offered in the electronic marketplace. The associations between individual items and the shopping cart may be stored by the input processing module 810 within the user profile data store 804 in a user profile associated with the user.

In at least one embodiment, the input processing module 810 may be configured to receive a request initiated via the application 706 to add and/or remove an item from the user's shopping cart. In some examples, the input processing module 810 may access the inventory data store 806 to obtain item information in response to the request. The input processing module 810 may further be configured to update the shopping cart associated with the user within the user profile data store 804 to reflect the appropriate addition/removal. The input processing module 810 may interact with the output manager 818, a component of the fluid endcap engine 102 that is configured to provide and/or update network pages of the electronic marketplace. Specifically, the input processing module 810 may cause the output manager 818 to update the network page 110 to indicate that the item has been added or removed from the shopping cart. In a non-limiting example, the addition or removal of the item from the shopping cart may update an item information section (e.g., the item information section 112 described above).

In at least one embodiment, the input processing module 810 may be configured to receive order requests from the user (e.g., via the application 706). In response to receive an order request, the input processing module 810 may be further configured to cause the output manager 818 to provide one or more network pages associated with a procedure for completing an order (e.g., entering in billing and/or shipping information, confirming the order, etc.). Upon receiving an order request, upon completion of an order, or at any suitable time, the input processing module 810 may store and maintain past-purchase information (e.g., past-purchase history) indicating order details associated with an orders that have been initiated by the user. The input processing module 810 may store any suitable historical information (including navigational history and/or past-purchase history) associated with the user within the user profile data store 804 in a record associated with the user.

In at least one embodiment, the input processing module 810 may be configured to enforce one or more restrictions related to a shopping cart. As a non-limiting example, it may be the case that items associated with the shopping cart must be associated with a common attribute such as a common merchant offeror. In such cases, upon receiving a request to add an item that is restricted, the input processing module 810 may cause the output manager 818 to provide an indication to the user via the application 706, that the item has not and/or cannot be added to the shopping cart. Any suitable type of restriction may be associated with the shopping cart, a common merchant offeror is offered merely as an illustrative example.

In at least one embodiment, the condition management module 812 may be configured to obtain item information of a set of items associated with the user's shopping cart. In some examples, the condition management module 812 may be configured to receive such information from the input processing module 810. In other examples, the condition management module 812 may retrieve such information, in whole or in part, from the user profile data store 804 by accessing a user profile associated with the user. The condition management module 812 may be further configured to determine one or more threshold conditions for the shopping cart. For example, the condition management module 812 may access a profile associated with a merchant from the merchant profile data store 805, a data store configured to store such information. The condition management module 812 may be further configured to cause the output manager 818 to display information indicative of the existence of one or more threshold conditions associated with the merchant. For example, the condition management module 812 may cause the output manager 818 to provide the condition information sections described in the above figures. Examples of a threshold condition may include, but are not limited to, a minimum total purchase amount, a minimum/maximum quantity of total items, a minimum/maximum quantity of a particular item, a temperature requirement (e.g., items must remain refrigerated/cooled/frozen/heated/etc.), a minimum/maximum combined weight (under/over 50 lbs.), a minimum/maximum combined volume (e.g., less than a total volume capacity of a shipping container), or the like.

In at least one embodiment, the condition management module 812 may be configured to calculate a remainder value, that is a difference between a current state of the shopping cart (e.g., a subtotal amount, a quantity of items of the cart, a quantity of a particular item, a temperature requirement for the combined items of the shopping cart, a current combined weight of the shopping cart, a current combined volume of the shopping cart, etc.) and a threshold condition (e.g., a minimum and/or maximum total purchase amount, a minimum and/or maximum quantity of items, a minimum and/or maximum quantity of a particular item, a temperature/temperature range requirement, a minimum and/or maximum weight, a geographical requirement, a minimum and/or maximum volume requirement). The condition management module 812 may be configured to cause the output manager 818 to provide the remainder value and/or additional text and/or graphical elements to inform the user of the condition and/or of a status with respect to the condition. In examples in which the condition is directed to requiring a particular number of items to be associated with the shopping cart, or a particular quantity associated with an item to be met, the condition management module 812 may calculate remainder values indicating how many additional items/quantities are needed before the condition is met. Generally, the condition management module 812 may be configured to calculate a difference between a current state of the shopping cart and a threshold condition associated with the shopping cart.

In at least one embodiment, the condition management module 812 may be configured to cause the output manager 818 to provide (or enable a previously-disabled) interface element (e.g., a checkout button). For example, the condition management module 812 may determine that a condition associated with the shopping cart (and/or the merchant of the items included in the shopping cart) is met. Accordingly, the condition management module 812 may send an indication that the condition is met to the output manager 818. Upon receiving indication that the condition has been met, the output manager 818 may be configured to provide and/or enable a previously-disabled interface element to enable the user to complete the order.

In at least one embodiment, the statistical model manager 814, a component of the fluid endcap engine 102, may be configured to retrieve historical information (e.g., navigational history, past-purchase history, etc.) associated with a user from, for example, the user profile data store 804. The historical information associated with the user may include search history, wish list content, shopping cart content, navigational history, selection history, purchase history, shipping selection, review content, to name a few. The historical information may also include interaction information associated with interactions by the user with respect to previously-presented featured items lists. The statistical model manager 814 may be configured to provide and maintain one or more statistical models for determining various correlations associated with the user based on the historical information associate with the user.

For example, the statistical model manager 814 may train a statistical model based on the historical information of the user (e.g., navigational history, past-purchase history, etc.) to determine various correlations between item attributes (e.g., a name, a description, a brand, a sales price, a listing price, an item category, etc.) and purchases of the user. The statistical model manager 814 may be further configured to obtain historical information of other users of the electronic marketplace. In some examples, such information may be stored as part of the inventory data store 806. The statistical model manager 814 may utilize browsing history associated with other electronic marketplace users and/or conversion rates associated with items offered within the electronic marketplace to train a statistical model. The statistical model may take item information and/or information associated with the user as input and provide a score for the item indicating a likelihood that the user may purchase the item. For example, the statistical model may be trained to identify that it is likely (e.g., 75% percent likely, more likely than not, etc.) that the user will purchase a particular electronic device because the user has purchased electronic devices relatively often in the past. As another non-limiting example, the model may indicate that it is likely that the user will purchase a particular item because the particular item has been purchased over a threshold number of times by other users of the electronic marketplace.

In at least one embodiment, the endcap population engine 816 may be configured to identify a set of items to be provided on the network page 110. As a non-limiting example, the endcap population engine 816 may be configured to determine a number of featured items to be provided in a featured items section as discussed in connection with the above figures. The endcap population engine 816 may be configured to determine potential set of items. In some examples, the endcap population engine 816 may be configured to access the inventory data store 806 to obtain item information for all, or some subset, of the items offered within the catalog. In some examples, the endcap population engine 816 may execute a related items search against the catalog to determine a number of related items that relate to one or more items already associated with the user's shopping cart. The endcap population engine 816 may rank the related items according to a degree of similarity with one or more items already associated with the shopping cart. In some examples, the endcap population engine 816 may select some subset of the related items according to the ranking.

In at least one embodiment, the endcap population engine 816 may be configured to identify popular items within the electronic marketplace based on browsing history (e.g., how many times the item has been viewed by users of the electronic marketplace) and/or conversion rates associated with individual items. In at least one embodiment, the endcap population engine 816 may access the user profile associated with the user to identify additional shopping carts (e.g., a wish list, a favorites list, etc.) in order to identify the potential set of items to be featured. In at least one embodiment, the endcap population engine 816 may utilize a geographical region in order to identify the potential set of items to be featured (e.g., other items that are offered within the geographical region). The endcap population engine 816 may further be configured to access past-purchase history and/or browsing history associated with the user in order to identify the potential set of items. It should be appreciated that the examples provided herein are not an exhaustive list, and that any suitable information, related to the particular user, other users of the electronic marketplace, or individual items of the catalog may be utilized by the endcap population engine 816 to determine a potential set of items.

Upon determining a potential set of items to be featured on the network page 110, the endcap population engine 816 may be configured to submit item information associated with potential set of items to the statistical model manager 814 for scoring. The statistical model manager 814 may be configured to receive the item information and generate a score for each item of the potential set of items and provide the corresponding scores to the endcap population engine 816. In accordance with at least one embodiment, the endcap population engine 816 may be configured to rank the potential set of items according to the scores provided by the statistical model manger 814. In some examples, the endcap population engine 816 may cause the output manager 818 to provide the potential set of items according to the ranking. In at least one embodiment, the endcap population engine 816 may provide a subset (e.g., 20 out of 40, 10 out of 100, etc.) of the potential set of items to the output manager 818 for display within the network page 110. In at least one example, the endcap population engine 816 may determine a particular subset of the potential set of items based at least in part on the ranking.

Figure 9:
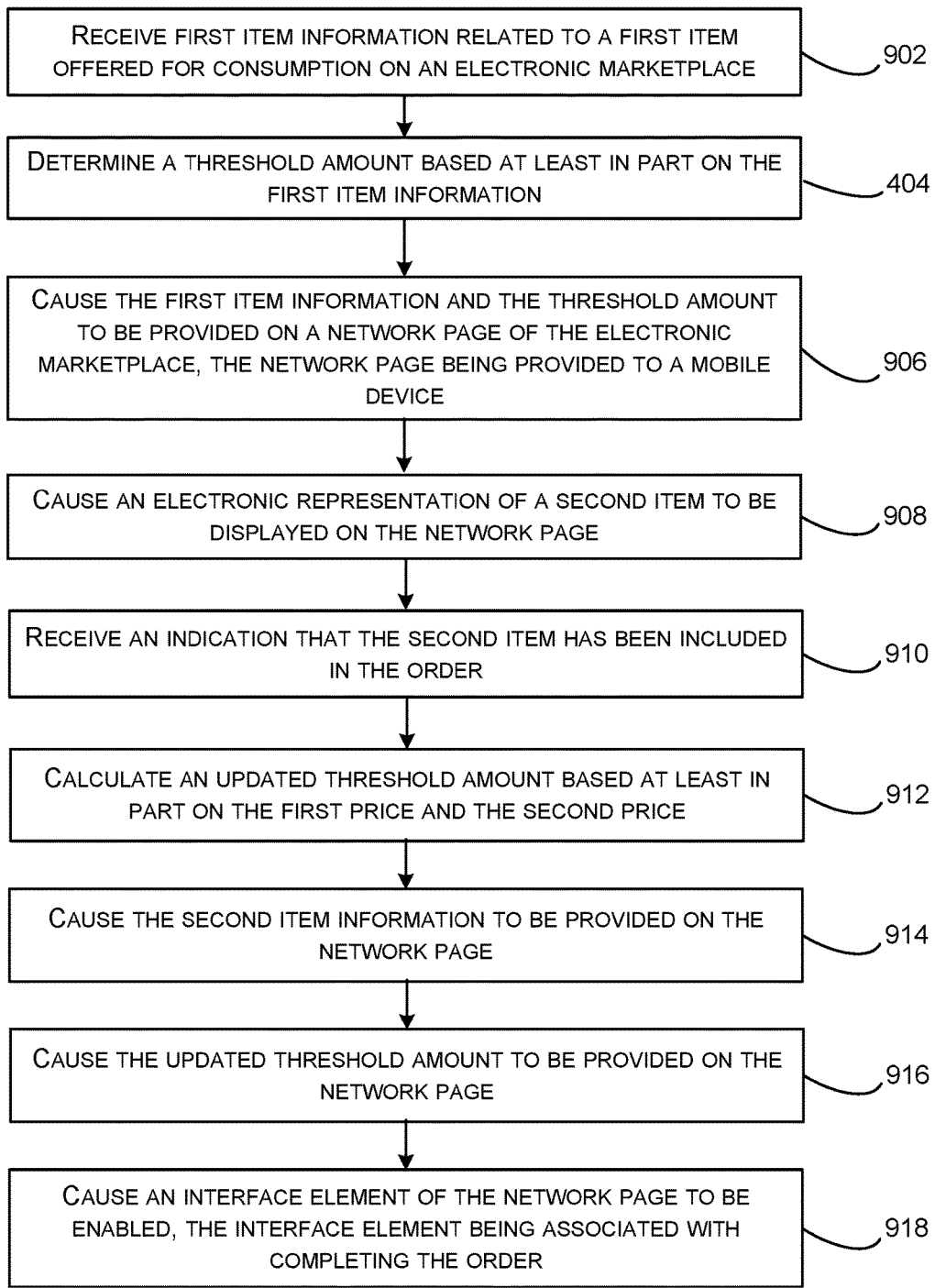
FIG. 9 is a flowchart illustrating an example method for providing item information utilizing the fluid endcap engine, in accordance with at least one embodiment.

FIG. 9 is a flowchart illustrating an example method 900 for providing item information utilizing the fluid endcap engine 102 of FIG. 1, in accordance with at least one embodiment. The method 900 may begin at block 902, first item information related to a first item offered for consumption on an electronic marketplace may be received (e.g., by the input processing module 810 of FIG. 8). In some examples, the first item information may comprise a merchant and/or a first price associated with the first item.

At block 904, a threshold amount may be determined (e.g., by the condition management module 812 of FIG. 8) based at least in part on the first item information. In at least one example, the threshold amount may be indicative of a difference between the first price and a minimum total purchase amount for items. In at least one example, the minimum total purchase amount may be a threshold condition that is to be met or exceeded prior to enabling an order for the first item to be completed. As indicated above, the condition management module 812 may identify the minimum total purchase amount from, for example, a profile associated with the merchant associated with the first item.

At block 906, the input processing module 810 and/or the condition management module 812 may cause the first item information and the threshold amount to be provided on a network page of the electronic marketplace. In some examples, the network page (e.g., the network page 110) may be provided to a mobile device (e.g., the electronic device 106 of FIG. 1 via the application 706 of FIG. 7, the application 706 being configured to render the network page 110).

At block 908, the output manager 818 may cause an electronic representation of a second item (e.g., an image of the item or other suitable item information) to be displayed on the network page 110. In at least one embodiment, the second item may relate to the first item (e.g., a similar item category, a related item). In other embodiments, the second item may relate to the difference between the first price and the minimum total purchase amount (e.g., an item that costs less than or equal to the difference). The second item may relate to items already purchased by the user, or other users of the electronic marketplace. The second item may be a popular item (e.g., an item that has been ordered over a threshold number of time by the user or other users of the electronic marketplace). In some examples, the endcap population engine 816 may identify the second based at least in part on the first item information (e.g., title, purchase price, discounted price, item description, brand, item category, color, material, manufacturer, etc.).

At block 910, an indication that the second item has been included in an order may be received (e.g., by the input processing module 810). In at least one example, the indication may be initiated from the network page (e.g., via user action).

At block 912, an updated threshold amount may be calculated (e.g., by the condition management module 812). In at least one example, the updated threshold amount may be based at least in part on the first price and the second price.

At block 914, the input processing module 810, utilizing the output manager 818, may cause the second item information to be provided on the network page. At block 918, the condition management module 812, utilizing the output manager 818, may cause the updated threshold amount to be provided on the network page. In at least one example, the updated threshold amount may be provided on the network page based at least in part on determining that the combination of the first price and the second price is less than the minimum total purchase amount needed to enable completion of the order.

At block 918, the condition management module 812, utilizing the output manager 818, may cause an interface element of the network page to be enabled. The interface element may be enabled based at least in part on determining (e.g., by the condition management module 812) that the minimum total purchase amount for the items to be purchased has been met or exceeded by the combination of the first price and the second price. In at least one embodiment, the interface element (e.g., the interface element 508 of FIG. 5) may be associated with completing the order.

Figure 10:
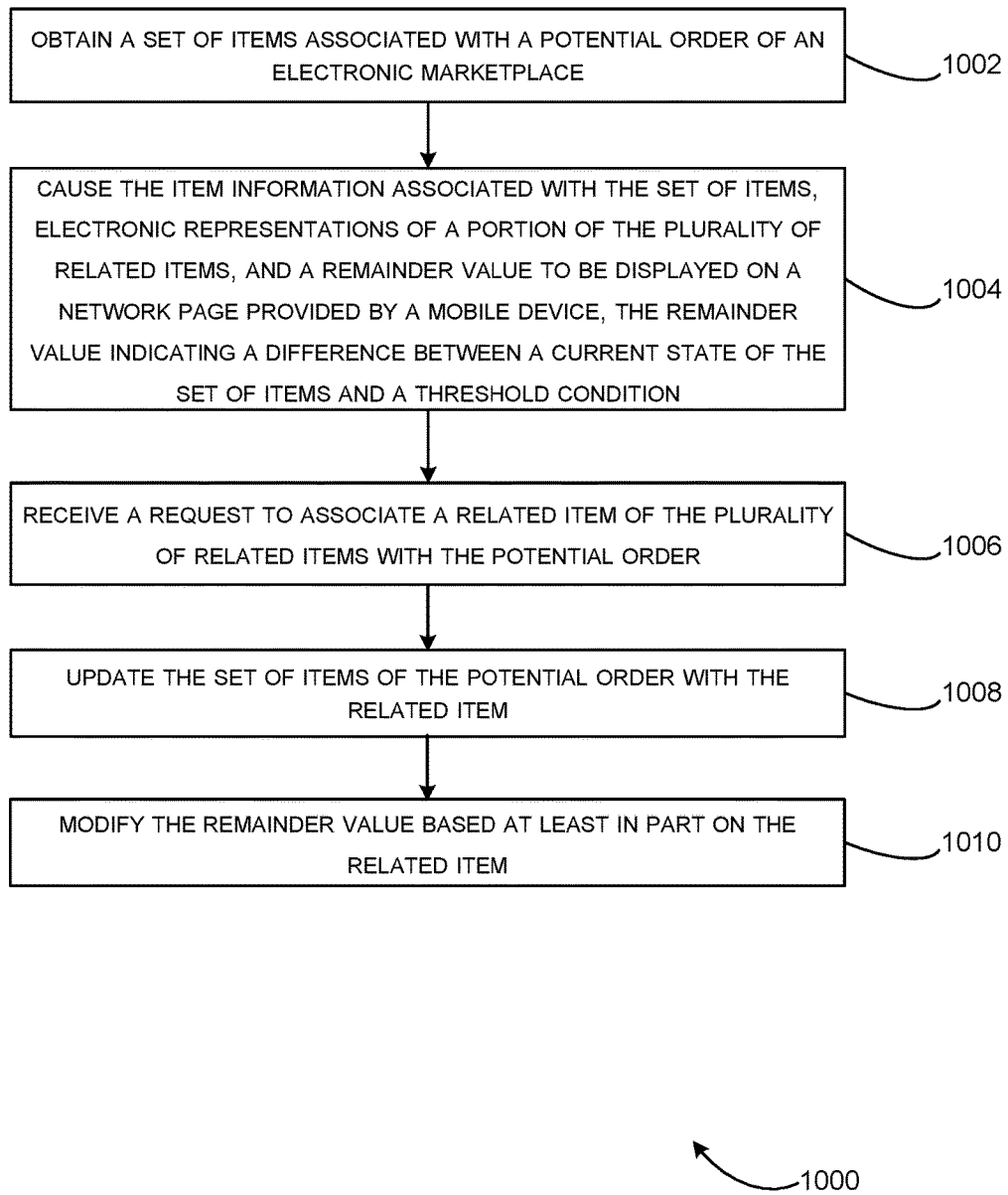
FIG. 10 is a flowchart illustrating an additional example method for providing item information utilizing the fluid endcap engine, in accordance with at least one embodiment.

FIG. 10 is a flowchart illustrating an additional example method 1000 for providing item information utilizing the fluid endcap engine 102 of FIG. 1, in accordance with at least one embodiment. The method 1000 may be performed by a system comprising one or more memories configured to store computer-executable instructions and one or more processors configured to access the memory and execute the computer-executable instructions to perform the operations of the method 1000.

The method 1000 may begin at block 1002, where a set of items associated with a potential order of an electronic marketplace may be obtained (e.g., by the input processing module 810 of FIG. 8). In at least one embodiment, the potential order may be related to a threshold condition that must be met or exceeded before completion of the potential order may be enabled. Examples of a threshold condition may include a minimum total purchase amount, a minimum/maximum quantity of total items, a minimum/maximum quantity of a particular item, a temperature requirement (e.g., items must remain refrigerated/cooled/frozen/heated/etc.), a minimum/maximum combined weight, a minimum/maximum combined volume (e.g., under a total container capacity of a shipping container), etc.).

At block 1004, the output manager 818 of FIG. 8 may cause the item information associated with the set of items, electronic representations of a portion of the plurality of related items, and a remainder value to be displayed on a network page (e.g., the network page 110) provided by a mobile device (e.g., the electronic device 106 of FIG. 1). In at least one example, the remainder value may indicate a difference between a current state of the set of items and the threshold condition. In some examples, the endcap population engine 816 may identify the plurality of related items based at least in part on the item information associated with the item.

At block 1006, a request to associate a related item of the plurality of related items with the potential order may be received (e.g., by the input processing module 810). At block 1008, the set of items of the potential order may be updated with the related item (e.g., by the input processing module 810). At block 1012, the remainder value may be modified (e.g., by the condition management module 812 and displayed by the output manager 818) based at least in part on the update.

Figure 11:
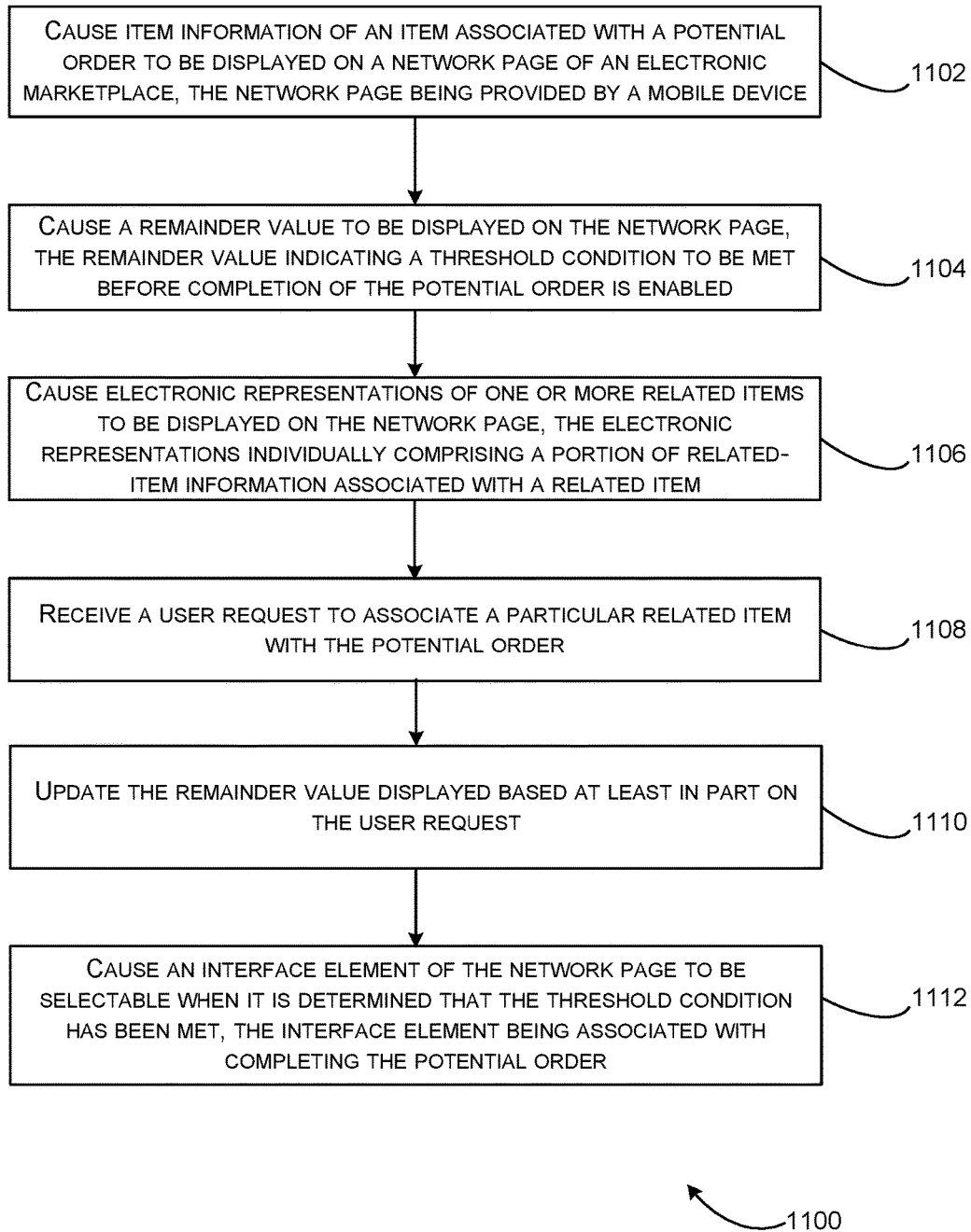
FIG. 11 is a flowchart illustrating one further example method for providing item information utilizing the fluid endcap engine, in accordance with at least one embodiment.

FIG. 11 is a flowchart illustrating one further example method 1100 for providing item information utilizing the fluid endcap engine 102 of FIG. 1, in accordance with at least one embodiment. A computer-readable medium may store computer-executable instructions that, when executed by at least one processor, cause at least one computer to perform instructions comprising the operations of the method 1100.

The method 1100 may begin at block 1102, where the input processing module 810 of FIG. 8, utilizing the output manager 818 of FIG. 8, may cause item information of an item associated with a potential order to be displayed on a network page of an electronic marketplace (e.g., the network page 110). In at least one example, the network page may be provided by a mobile device (e.g., the electronic device 106 of FIG. 1).

At block 1104, the condition management module 812, utilizing the output manager 818, may cause a remainder value to be displayed on the network page 110. In at least one example, the remainder value may indicate a threshold condition to be met before completion of the potential order is enabled.

At block 1106, the endcap population engine 816, utilizing the output manager 818, may cause electronic representations of the one or more related items to be displayed on the network page 110. In at least one example, the electronic representations individually comprising a portion of related-item information associated with a related item (e.g., item images or other suitable item information associated with the related item). In at least one embodiment, the one or more related items may be related to the item and/or the threshold condition.

At block 1108, a user request to associate a particular related item with the potential order may be received (e.g., by the input processing engine 810).

At block 1110, the displayed remainder value may be updated based at least in part on the user request (e.g., by the condition management module 812 utilizing the output manager 818). For example, the condition management module 812 may calculate values associated with a current state of the shopping cart (e.g., a total quantity of items in the cart, a total quantity of a particular item, a combined weight, a combined volume, a minimum/maximum temperature/temperature range needed for the items in the cart, etc.) and a difference between the current state of the shopping cart and the threshold condition. Accordingly, the remainder value may indicate that an additional $20 is needed, 5 more items are needed, 3 more of a particular item is needed, an additional item must be under 3 cubic inches, 3 more lbs. are needed, etc.

At block 1112, the condition management module 812, utilizing the output manager 818 may cause an interface element of the network page 110 to be selectable when it is determined that the threshold condition has been met. In at least one example, the interface element may be associated with completing the potential order.

Figure 12:
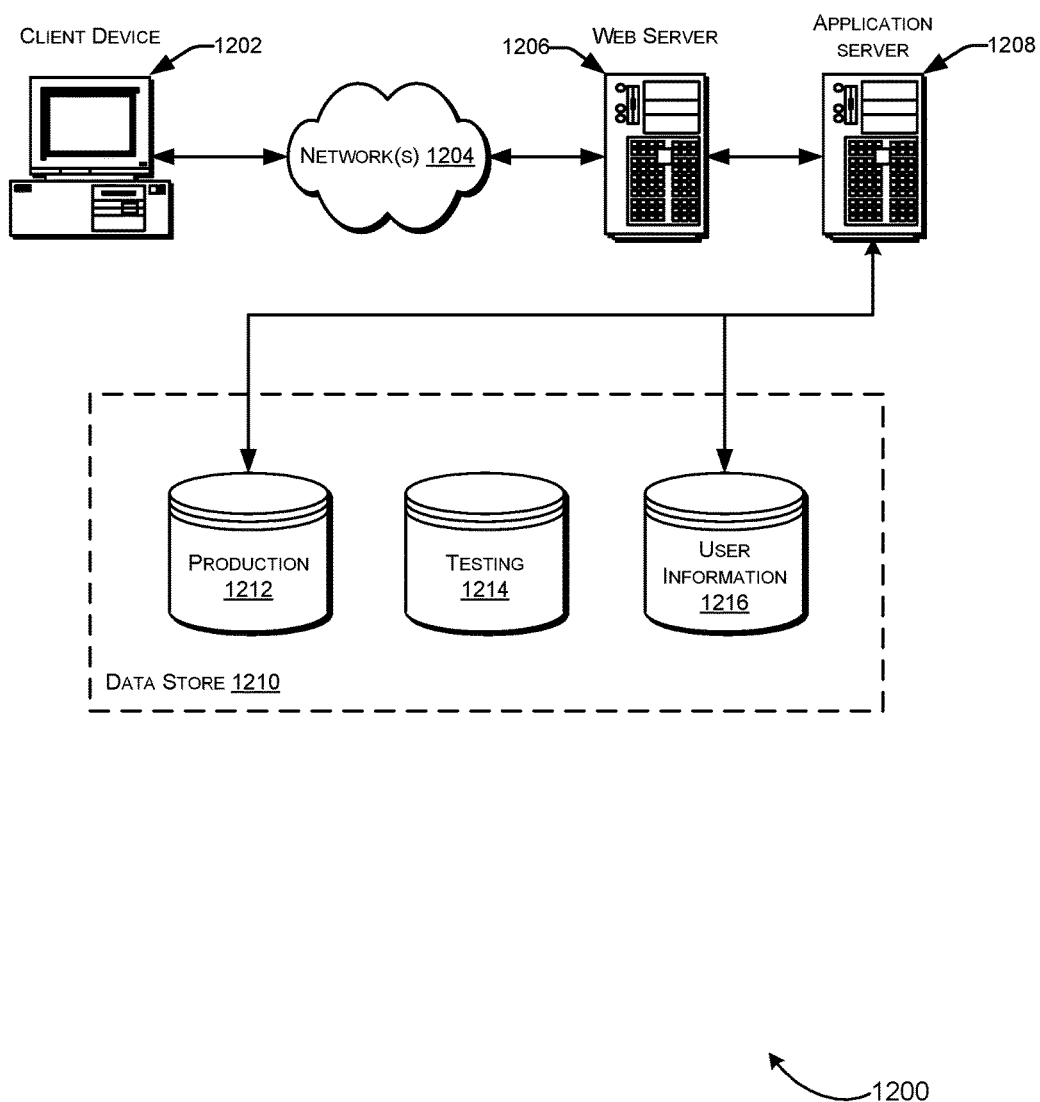
FIG. 12 is a schematic diagram illustrating an example environment for implementing aspects of the invention in accordance with at least one embodiment described herein.

FIG. 12 illustrates aspects of an example system 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
providing, at a network page presented on a mobile device, first item information related to a first item selected for an order, the first item information identifying a merchant and a first price associated with the first item;
calculating a remainder amount specifying a difference between the first price and a minimum total purchase amount, the minimum total purchase amount being a threshold condition that is to be met prior to enabling the order comprising the first item to be completed;
causing the first item information and the remainder amount to be provided on the network page;
causing an image of a second item to be presented on the network page;
receiving user input indicating an interaction with the image of the second item presented on the network page;
in response to receiving the user input, modifying the network page to provide an expanded view of the second item, the expanded view comprising the image of the second item and additional item information associated with the second item and previously lacking from the network page;
receiving an indication that the second item has been included in the order, the indication being initiated from the expanded view of the network page;
calculating an updated remainder amount based at least in part on combining the first price of the first item and a second price of the second item; and
causing an interface element of the network page to be enabled based at least in part on determining that the minimum total purchase amount has been met by the combination of the first price and the second price, the interface element being associated with completing the order.

2. The computer-implemented method of claim 1, wherein the first item and the second item are associated with a common merchant, wherein the method further comprises selecting the second item based at least in part on the common merchant, and where the threshold condition being met depends at least in part on the second item being associated with the common merchant.

3. The computer-implemented method of claim 1, wherein the second item is determined further based at least in part on a geographical region, the geographical region being provided on the network page.

4. The computer-implemented method of claim 1,
enlarging a size of the image of the second item according to the user input, wherein the image of the second item as enlarged replace the image of the second item that was originally presented on the network page.

5. A system, comprising:
one or more memories configured to store computer-executable instructions; and
one or more processors configured to access the memory and execute the computer-executable instructions to at least:
obtain a set of items associated with a potential order, the potential order being related to a threshold condition that must be met or exceeded before completion of the potential order is enabled;

cause item information associated with the set of items, electronic representations of a set of related items, and a remainder value to be displayed on a network page provided by a mobile device, the remainder value quantifying a calculated difference between a current state of the set of items and the threshold condition;

receive user input indicating an interaction with an electronic representation of a related item of the set of related items;

provide an expanded view of at least the related item within the network page, the expanded view comprising at least the electronic representation of the related item and additional item information associated with the related item and previously lacking from the network page;

receive a request to associate the related item with the potential order;

update the set of items of the potential order with the related item based on the request;

modify the remainder value based at least in part on the update; and causing an interface element of the network page to be selectable when it is determined that the threshold condition has been met, the interface element being associated with completing the potential order.

6. The system of claim 5, the one or more processors being further configured to execute the computer-executable instructions to:
display an interface element on the network page, the interface element being associated with advancing the potential order to purchase; and
inhibit the interface element from being selectable until the threshold condition has been met.

7. The system of claim 5, wherein the electronic representations individually depict an image of a single related item.

8. The system of claim 5, the one or more processors being further configured to execute the computer-executable instructions to at least:
receive a request to revert to a collapsed view of the set of items; and
in response to the request, revert to displaying, within the network page, the electronic representation of the related item in lieu of the expanded view.

9. The system of claim 8, wherein the request to revert is initiated from an interface element of the network page provided in the expanded view.

10. The system of claim 5, wherein the electronic representations initially displayed on the network page after receiving the user input represent a subset a larger set of related items.

11. The system of claim 5, the one or more processor being further configured to execute the computer-executable instructions to at least:
receive a navigation request associated with the electronic representations, the navigation request indicating a scrolling action at an area of the network page; and
display different electronic representations associated with a different portion of the set of related items based at least in part on the navigation request.

12. The system of claim 5, the processor being further configured to execute the computer-executable instructions to at least:
in response to updating the set of items of the potential order, calculate a new remainder value based at least in part on the updated set of items and the threshold condition;
update the remainder value displayed on the network page with the new remainder value;
determine a new set of related items based at least in part on the updated remainder value; and
cause new electronic representations of at least one of the new set of related items to be displayed on the network page provided by the mobile device.

13. The system of claim 5, wherein the processor is further configured to execute the computer-executable instructions to at least:
determine the threshold condition has been met based at least in part on the updated set of items; and
cause an interface element of the network page that was previously presented but disabled to be enabled when the threshold condition has been met, the interface element being associated with completing the potential order.

14. The system of claim 13, wherein the processor is further configured to execute the computer-executable instructions to remove the remainder value from the network page based at least in part on the threshold condition being met.

15. A computer-readable medium having stored thereon computer-executable instructions that, when executed by at least one processor, cause at least one computer to perform instructions comprising:
causing item information of an item associated with a potential order to be displayed on a network page presented at a mobile device;
causing a remainder value to be displayed on the network page, the remainder value indicating a difference between a current value associated with the potential order and a threshold condition to be met before completion of the potential order is enabled;
causing electronic representations of one or more related items to be displayed on the network page, the electronic representations individually comprising a portion of related-item information associated with a related item, the one or more related items being related to the item and the threshold condition;
receiving user input indicating an interaction with an electronic representation of a related item of the one or more related items;
providing an expanded view of the related item within the network page, the expanded view comprising at least the electronic representation of the related item and additional item information associated with the related item previously lacking from the network page;
receiving a user request to associate the related item with the potential order;
updating the remainder value displayed based at least in part on the user request; and
causing an interface element of the network page to be selectable when it is determined that the threshold condition has been met, the interface element being associated with completing the potential order.

16. The computer-readable medium of claim 15, wherein the threshold condition is at least one of meeting a monetary threshold, meeting a particular quantity of total items, meeting a particular quantity of a particular item, meeting a volume restriction associated with a shipping container, meeting a weight restriction, or meeting a temperature restriction.

17. The computer-readable medium of claim 15, wherein the one or more related items are determined based at least in part on navigational history and past-purchase history of a user associated with the mobile device.

18. The computer-readable medium of claim 17, wherein the one or more related items are selected from a catalog of items based at least in part on a merchant of the item.

19. The computer-readable medium of claim 15, the at least one computer performing further instructions comprising:
   receiving a navigation request related to electronic representations of the one or more related items; and
   adding an additional related item to the one or more related items based at least in part on the navigation request.

20. The computer-readable medium of claim 14, wherein the user request to associate the related item with the potential order is initiated by a drag-and-drop action performed by the user on the network page.

\* \* \* \* \*